United States Patent
You et al.

(10) Patent No.: US 9,512,982 B2
(45) Date of Patent: Dec. 6, 2016

(54) BACKLIGHT ASSEMBLY

(71) Applicant: Samsung Display Co., Ltd., Yongin-City, Gyeonggi-do (KR)

(72) Inventors: Jae Ho You, Gwangmyeong-si (KR); Hyun Deok Im, Seoul (KR); Byoung Ho Cheong, Yongin-si (KR)

(73) Assignee: SAMSUNG DISPLAY CO., LTD., Yongin, Gyeonggi-Do (KR)

(*) Notice: Subject to any disclaimer, the term of this patent is extended or adjusted under 35 U.S.C. 154(b) by 748 days.

(21) Appl. No.: 13/684,732

(22) Filed: Nov. 26, 2012

(65) Prior Publication Data

US 2014/0022817 A1    Jan. 23, 2014

(30) Foreign Application Priority Data

Jul. 18, 2012  (KR) .......................... 10-2012-0078430

(51) Int. Cl.
 *G02B 6/122* (2006.01)
 *F21V 8/00* (2006.01)
 *F21V 13/00* (2006.01)
 *G02F 1/1335* (2006.01)

(52) U.S. Cl.
 CPC ............ *F21V 13/00* (2013.01); *G02B 6/0053* (2013.01); *G02F 1/133608* (2013.01); *G02B 6/0046* (2013.01); *G02B 6/0051* (2013.01); *G02B 6/0065* (2013.01)

(58) Field of Classification Search
 CPC .................. G02B 6/0053; G02B 6/046–6/0048
 See application file for complete search history.

(56) References Cited

U.S. PATENT DOCUMENTS

| | | | |
|---|---|---|---|
| 6,425,673 B1* | 7/2002 | Suga et al. ................ | 362/613 |
| 8,085,364 B2 | 12/2011 | Travis | |
| 8,113,704 B2 | 2/2012 | Bae et al. | |
| 2008/0225205 A1 | 9/2008 | Travis | |
| 2009/0154141 A1 | 6/2009 | Hsiao | |
| 2009/0213297 A1 | 8/2009 | You et al. | |
| 2009/0316072 A1* | 12/2009 | Okumura ............... | G02B 5/021 349/64 |

FOREIGN PATENT DOCUMENTS

| | | |
|---|---|---|
| CN | 101473167 | 7/2009 |
| CN | 201269932 | 7/2009 |

(Continued)

OTHER PUBLICATIONS

Adrain Travis et al., "Collimated Light From A Waveguide For A Display Backlight", Oct. 26, 2009, vol. 17, No. 22, Optics Express.

*Primary Examiner* — Mariceli Santiago
(74) *Attorney, Agent, or Firm* — F. Chau & Associates, LLC

(57) ABSTRACT

A backlight assembly includes a light source unit configured to supply light, a light guide plate configured to guide light incident from the light source unit to an upper surface thereof, a reverse prism sheet disposed on the light guide plate and having a prism-shaped lower surface and an auxiliary film disposed between the light guide plate and the reverse prism sheet, in which the light guide plate includes a light-incident portion on which light is incident from the light source unit and a light-facing portion facing the light-incident portion.

24 Claims, 13 Drawing Sheets

(56) References Cited

FOREIGN PATENT DOCUMENTS

| | | |
|---|---|---|
| JP | 10-253830 | 9/1998 |
| JP | 2000-348515 | 12/2000 |
| JP | 205-071928 | 3/2005 |
| KR | 1020090011286 | 2/2009 |
| KR | 1020090022229 | 3/2009 |
| KR | 1020090071801 | 7/2009 |
| KR | 1020100108003 | 10/2010 |
| KR | 1020110064854 | 6/2011 |
| KR | 1020110096875 | 8/2011 |
| KR | 1020110138585 | 12/2011 |

\* cited by examiner

BACKLIGHT ASSEMBLY

CROSS-REFERENCE TO RELATED APPLICATION

This application claims priority to Korean Patent Application No. 10-2012-0078430 filed on Jul. 18, 2012, the entire disclosure of which is hereby incorporated by reference herein in its entirety.

(a) Technical Field

The present disclosure relates to a backlight assembly, and more particularly, to a backlight assembly capable of allowing light to be uniformly emitted.

(b) Discussion of the Related Art

A display device is required for a computer monitor, a television, a mobile phone and the like which are each widely used these days. Examples of display devices include but are not limited to a cathode ray tube display device, a liquid crystal display, a plasma display device, and the like.

A liquid crystal display, which is one of the most common types of flat panel displays currently in use, includes two display panels with field generating electrodes such as a pixel electrode and a common electrode and a liquid crystal layer interposed therebetween. The liquid crystal display generates an electric field in the liquid crystal layer by applying voltages to the field generating electrodes. The generated electric field determines orientations of liquid crystal molecules of the liquid crystal layer, thereby controlling polarization of incident light so as to display images.

As the liquid crystal display is not a self-luminous device, the liquid crystal display needs a light source. In this case, the light source may be, for example, a separately mounted artificial light source or a natural light source. The artificial light source requires a light guide plate (LGP) for emitted light to reach the entire display panel with uniform luminance.

The light guide plate is designed such that light incident on a lateral surface may be emitted to the entire upper surface thereof evenly. However, there may be a difficulty during an injection process for manufacturing a light guide plate, in which a molding defect may be generated at a corner of the light guide plate and accordingly, a dark area, in which light is not properly emitted to an upper surface of the light guide plate, appears.

SUMMARY OF THE INVENTION

Exemplary embodiments of the present invention provide a backlight assembly having benefits such as allowing light to be uniformly emitted.

An exemplary embodiment of the present invention provides a backlight assembly including: a light source unit configured to supply light, a light guide plate configured to guide light incident from the light source unit to an upper surface thereof; a reverse prism sheet disposed on the light guide plate and having a prism-shaped lower surface and an auxiliary film disposed between the light guide plate and the reverse prism sheet, in which the light guide plate includes a light-incident portion on which light is incident from the light source unit and a light-facing portion facing the light-incident portion.

In addition, the thickness of the light-facing portion may be larger than the thickness of the light-incident portion and the light-facing portion may have a prism shape.

The backlight assembly may further include an air layer disposed between the light guide plate and the auxiliary film.

The backlight assembly may further include lower protrusion patterns disposed on a lower surface of the auxiliary film.

The backlight assembly may further include upper protrusion patterns disposed on an upper surface of the auxiliary film.

The upper protrusion patterns and the lower protrusion patterns may be disposed in at least one of a spherical shape, a hemispherical shape, a cylindrical shape and a hexahedron shape.

The upper protrusion patterns and the lower protrusion patterns may be formed by a particle coating method.

The upper protrusion patterns and the lower protrusion patterns may include at least one material selected from a group consisting of polymethyl metacrylate, polystyrene, polycarbonate, polyurethane, nylon, polyolefin, silica and a silicon-based material.

Diameters or widths of the upper protrusion patterns and the lower protrusion patterns may be no greater than about 5 um.

The upper protrusion patterns and the lower protrusion patterns may be formed by an imprinting method.

The upper protrusion patterns and the lower protrusions patterns may include a UV curable resin.

Diameters or widths of the upper protrusion patterns and the lower protrusion patterns may be no greater than about 10 um.

Intervals of the upper protrusion patterns and the lower protrusion patterns may be no greater than about 10 mm.

The auxiliary film may be formed of a plurality of layers, and an intermediate protrusion pattern may be disposed between the plurality of layers.

A space between the plurality of layers may be filled with a medium having a different refractive index from that of the auxiliary film.

The auxiliary film may include a plurality of protrusion patterns disposed on a lower surface of the reverse prism sheet.

The auxiliary film may include a transparent material.

The auxiliary film may include a material having a refractive index of from about 1.41 to about 1.8.

A minimum thickness of the auxiliary film may be represented by $$h_{min} = \frac{d}{\tan\theta_2 - \tan\theta_1}$$

($h_{min}$ denotes a minimum thickness of the auxiliary film, d denotes a width of a dark area pattern where light is not emitted to the upper surface of the light guide plate, $\theta_1$ denotes an emission angle of light which is reflected by the lower surface of the light guide plate once and emitted from the light guide plate, and $\theta_2$ denotes an emission angle of light which is reflected by the lower surface of the light guide plate twice and emitted from the light guide plate).

The thickness of the light guide plate may gradually increase toward the light-facing portion from the light-incident portion.

The backlight assembly may further include a reflector disposed below the light guide plate and a diffuser disposed on the reverse prism sheet.

In accordance with an exemplary embodiment of the present invention, a backlight assembly includes a light source unit configured to supply light, a light guide plate configured to guide light incident from the light source unit to an upper surface thereof, and the light guide plate includes a light-incident portion on which light is incident from the light source unit and a light-facing portion facing the light-incident portion. The backlight assembly further includes a reverse prism sheet disposed on the light guide plate, an auxiliary film disposed between the light guide plate and the reverse prism sheet, and the auxiliary film includes a first film disposed on an upper surface of the light guide plate and a second film disposed on an upper surface of the first film and on a lower surface of the reverse prism sheet. In addition, the backlight assembly further includes a plurality of upper protrusion patterns disposed between the first film and the second film of the auxiliary film so as to maintain a predetermined distance between the first film and the second film and a plurality of lower protrusion patterns disposed on a lower surface of the first film of the auxiliary film so as to maintain a predetermined distance between the light guide plate and the auxiliary film.

The backlight assembly according to exemplary embodiment of the present invention has the following effects.

The backlight assembly according to exemplary embodiments of the present invention allows the light emitted from the upper surface of the backlight assembly to be uniformly distributed even though the light emitted from the light guide plate is not uniformly distributed by forming the auxiliary film between the light guide plate and the reverse prism sheet.

Further, when the backlight assembly according to exemplary embodiments of the present invention is used for a display device, the backlight assembly allows overall luminance of the display device to be uniform.

BRIEF DESCRIPTION OF THE DRAWINGS

Exemplary embodiments of the present invention can be understood in further detail from the following detailed description taken in conjunction with the attached drawings in which.

DETAILED DESCRIPTION OF EXEMPLARY EMBODIMENTS

Figure 1:
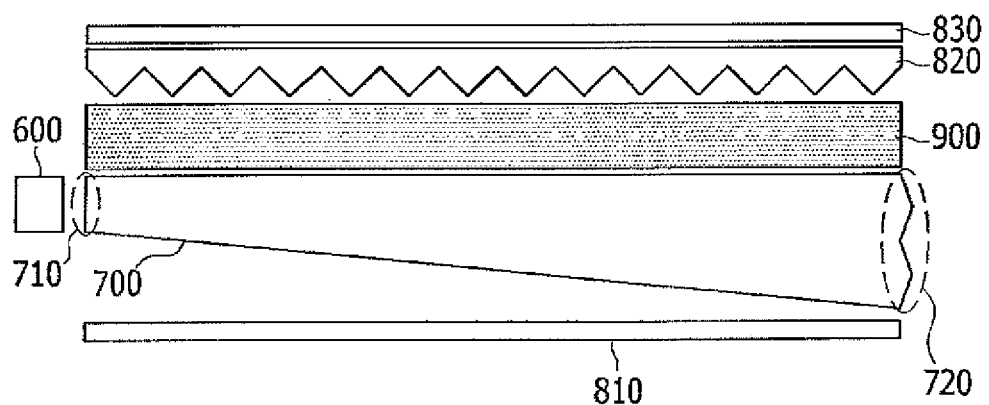
FIG. 1 is a cross-sectional view of a backlight assembly according to an exemplary embodiment of the present invention.

Exemplary embodiments of the present invention will be described more fully hereinafter with reference to the accompanying drawings, in which exemplary embodiments of the invention are shown.

In the drawings, the thickness of layers, films, panels, regions, etc., may be exaggerated for clarity. Like reference numerals designate like elements throughout the specification. It will be understood that when an element such as a layer, film, region, or substrate is referred to as being "on" another element, it can be directly on the other element or intervening elements may also be present.

As used herein, the singular forms, "a", "an", and "the" are intended to include plural forms as well, unless the context clearly indicates otherwise.

First, a backlight assembly according to an exemplary embodiment of the present invention will be described below with reference to the accompanying drawings.

FIG. 1 is a cross-sectional view of a backlight assembly according to an exemplary embodiment of the present invention.

The backlight assembly according to an exemplary embodiment of the present invention includes, for example, a light source unit 600 configured to supply light, a light guide plate 700 configured to guide the light incident from the light source unit 600 to an upper surface thereof, a reverse prism sheet 820 formed on the light guide plate 700, and an auxiliary film 900 formed between the light guide plate 700 and the reverse prism sheet 820.

The light source unit 600 is positioned, for example, at one side of the light guide plate 700 to supply light to the light guide plate 700. That is, the light source unit 600 is formed such that a light emitting surface thereof faces the one side of the light guide plate 700. The light source unit 600 may be configured by, for example, forming a plurality of light emitting members on a panel-shaped circuit board. The light emitting member may be, for example, a light emitting diode (LED), and the plurality of light emitting members may be are spaced apart from each other and disposed in a line.

The light guide plate 700 includes, for example, a light-incident portion 710 which is positioned to be adjacent to the light source unit 600 and on which light is incident from the light source unit 600, and a light-facing portion 720 which faces the light-incident portion 710. The thickness of the light-facing portion 720 is, for example, larger than that of the light-incident portion 710. In this case, the light guide plate 700 becomes gradually thicker toward the light-facing portion 720 from the light-incident portion 710. Therefore, most of the light incident on the light-incident portion 710 reaches the light-facing portion 720. In addition, an upper surface and a lower surface of the light guide plate 700 are, for example, not parallel to each other and the lower surface is inclined at a predetermined angle with respect to the upper surface.

The light-facing portion 720 of the light guide plate 700 has, for example, a prism shape and is made of a material which readily reflects light. Therefore, the light incident on the light-incident portion 710 is reflected by the light-facing portion 720 and reflected by the lower surface of the light guide plate 700 to arrive at the upper surface of the light guide plate 700. If an incidence angle of the light which arrives at the upper surface of the light guide plate 700 is smaller than a threshold angle of total reflection, the light is emitted from the upper surface of the light guide plate 700. If an incidence angle of the light which arrives at the upper surface of the light guide plate 700 is larger than the threshold angle of total reflection, the light is reflected by the upper surface of the light guide plate 700 and arrives back at the lower surface of the light guide plate 700. The light is reflected again by the lower surface of the light guide plate 700 and reaches the upper surface of the light guide plate 700. In this case, when the incidence angle of the light is larger than the threshold angle of total reflection, the light is emitted from the upper surface of the light guide plate 700. That is, after the light is reflected by the lower surface of the light guide plate 700 several times, the light can be emitted from the upper surface of the light guide plate 700.

Hereinafter, an emission angle of light emitting from the upper surface of the light guide plate 700 will be described with reference to FIG. 2 as follows.

Figure 2:
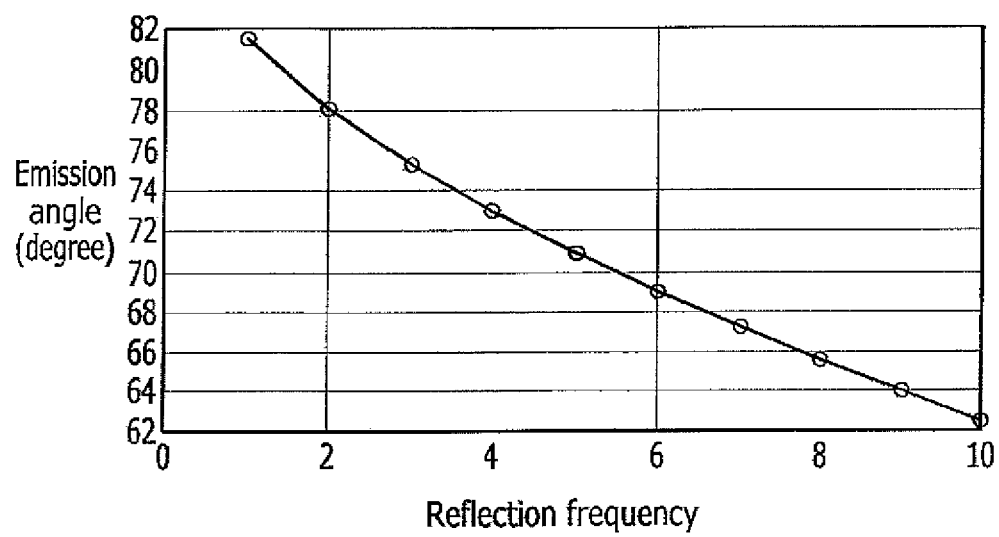
FIG. 2 is a graph showing an emission angle depending on the number of times light is reflected by a lower surface of a light guide plate in the backlight assembly of FIG. 1.

FIG. 2 is a graph showing an emission angle depending on the number of times light is reflected by a lower surface of the light guide plate 700 in the backlight assembly according to an exemplary embodiment of the present invention.

The emission angle of light emitted from the upper surface of the light guide plate 700 may be calculated by, for example, Equation 1.

$$\theta(n) = \sin^{-1}(n_1 \cdot \sin(\theta_c - 2\theta_w \cdot n))$$ (Equation 1)

(n denotes the number of times light is reflected by the lower surface of the light guide plate 700, $n_1$ denotes a refractive index of the light guide plate, θc denotes a threshold angle of total reflection, and θw denotes an angle formed between the lower surface and the upper surface of the light guide plate)

The emission angle of light is determined by the refractive index of the light guide plate, the threshold angle of total reflection and the angle formed between the lower surface and the upper surface of the light guide plate and depends on the number of times the light is reflected by the lower surface of the light guide plate 700.

For example, as shown in FIG. 2, when the emission angle of light which is reflected by the lower surface of the light guide plate 700 once and then emitted from the upper surface of the light guide plate 700 is about 82 degrees, the emission angle of light which is reflected by the lower surface of the light guide plate 700 twice and then emitted from the upper surface of the light guide plate 700 is about 78 degrees. That is, it can be seen that as the number of times the light is reflected by the lower surface of the light guide plate 700 increases, the emission angle of light is gradually reduced.

Referring back to FIG. 1, the reverse prism sheet 820 has, for example, a prism-shaped lower surface. A direction of the light emitted from the upper surface of the light guide plate 700 is changed at the reverse prism sheet 820. The angle incident on the reverse prism sheet 820 has an oblique angle with respect to the upper surface of the reverse prism sheet 820 and the light emitted from the reverse prism sheet 820 has an angle which is almost vertical to the upper surface of the reverse prism sheet 820.

For example, the auxiliary film 900 is formed between the light guide plate 700 and the reverse prism sheet 820 so as to maintain a predetermined distance between the light guide plate 700 and the reverse prism sheet 820. The light emitted from the light guide plate 700 is superposed while passing through the auxiliary film 900, thereby removing a dark area. An air layer may, for example, be formed between the auxiliary film 900 and the light guide plate 700. The reason is that when the auxiliary film 900 and the light guide plate 700 are in close contact with each other, the light may not be superposed while passing through the auxiliary film 900.

The auxiliary film 900 may be made of, for example, a transparent material. This allows most of the light emitted from the light guide plate 700 to be incident on the reverse prism sheet 820 without loss. The auxiliary film 900 may be made of, for example, a material having a refractive index of about 1.41 to about 1.8. The auxiliary film 900 may be made of, for example, the same material as that of the light guide plate 700 such as, for example, a transparent material, such as an acryl resin, polyolefin, polycarbonate, or polymethyl metacrylate (PMMA).

Hereinafter, a thickness of the auxiliary film 900 will be described with reference to FIGS. 1, 3 and 4 as follows.

Figure 3:
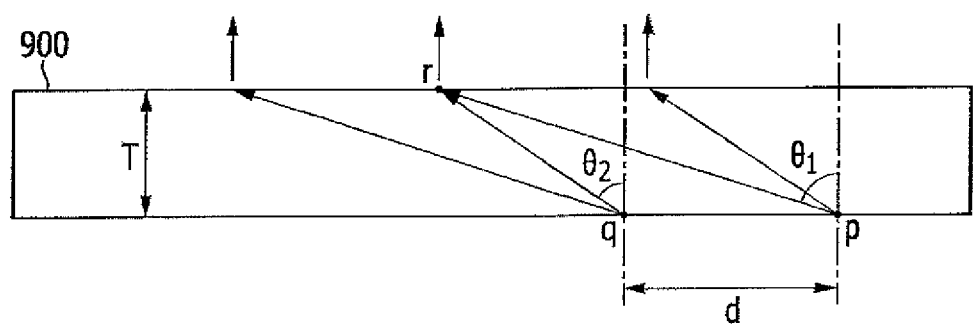
FIG. 3 is a diagram showing a path of light passing through an auxiliary film of the backlight assembly of FIG. 1.

FIG. 3 is a diagram showing a path of light passing through the auxiliary film 900 of the backlight assembly according to the present exemplary embodiment of the present invention. The reverse prism sheet (820 of FIG. 1) positioned on the auxiliary film 900 and the light guide plate (700 of FIG. 1) positioned below the auxiliary film 900 are not illustrated for convenience. FIG. 4 is a graph showing a minimum thickness of the auxiliary film depending on a width of a dark area pattern in the backlight assembly according to the present exemplary embodiment of the present invention.

The light guide plate 700 is designed such that light may be uniformly emitted to the upper surface. The light guide plate 700 may be manufactured through, for example, an injection molding process, and during the manufacturing process, a molding defect may be caused, and thus a dark area in which light is not properly emitted at some regions of the upper surface of the light guide plate 700 may be generated. For example, as shown in FIG. 3, the light emitted from the upper surface of the light guide plate 700 may not exist between a point p and a point q.

As described above, the emission angle of the light emitted from the upper surface of the light guide plate 700 depends on the number of times the light is reflected by the lower surface of the light guide plate 700. For example, an emission angle of light which is reflected by the lower surface of the light guide plate 700 once and then emitted from the light guide plate 700 may be defined as a first emission angle $\theta_1$, and an emission angle of light which is reflected by the lower surface of the light guide plate 700 twice and then emitted from the light guide plate 700 may be defined as a second emission angle $\theta_2$. When the light emitted from the light guide plate 700 is incident on the auxiliary film 900, the light is refracted. Thus, the incidence angle of light incident on the auxiliary film 900 may be, for example, different from the emission angle of the light emitted from the light guide plate 700, but for convenience, the angles are regarded as being the same, which will be described.

Light, which has the first emission angle $\theta_1$ and passes through the point p, meets light which has the second emission angle $\theta_2$ and passes through the point q at a point r. Accordingly, when the point r is formed within the auxiliary film 900, a dark area is prevented from being visible. To this end, the auxiliary film 900 may have, for example, a thickness such that the light, which has the first emission angle $\theta_1$ and passes through the point p, may meet the light which has the second emission angle $\theta_2$ and passes through the point q on the inside of the auxiliary film 900 or on the upper surface of the auxiliary film 900. The minimum thickness of the auxiliary film 900 may be calculated by, for example, Equation 2.

(Equation 2)

$$h_{min} = \frac{d}{\tan\theta_2 - \tan\theta_1}$$

($h_{min}$ denotes a minimum thickness of the auxiliary film, d denotes a width of a dark area pattern where light is not emitted to the upper surface of the light guide plate, $\theta_1$ denotes an emission angle of light which is reflected by the lower surface of the light guide plate once and emitted from the light guide plate, and $\theta_2$ denotes an emission angle of light which is reflected by the lower surface of the light guide plate twice and emitted from the light guide plate).

When the auxiliary film 900 is formed to have the minimum thickness calculated by Equation 2, the light, which has the first emission angle $\theta_1$ and passes through the point p, meets the light which has the second emission angle $\theta_2$ and passes through the point q on the upper surface of the auxiliary film 900. Further, when the auxiliary film 900 is formed to have a thickness exceeding the minimum thickness, the light, which has the first emission angle $\theta_1$ and passes through the point p, meets the light which has the second emission angle $\theta_2$ and passes through the point q on the inside of the auxiliary film 900. Therefore, it is possible to prevent a dark area from being visible due to superposition of lights having different emission angles.

Figure 4:
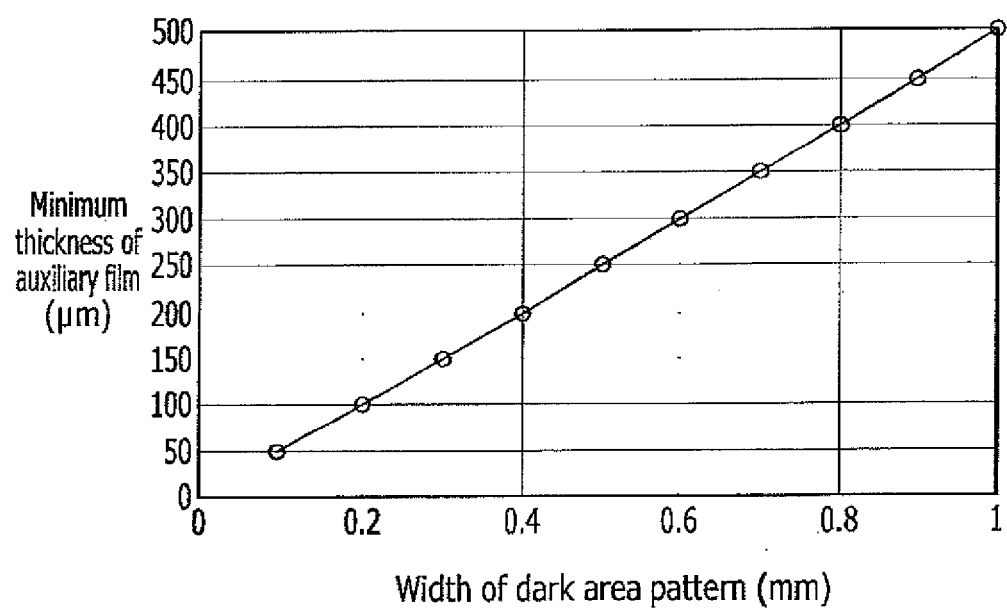
FIG. 4 is a graph showing a minimum thickness of an auxiliary film depending on a width of a dark area pattern in the backlight assembly of FIG. 1.

As shown in FIG. 4, as the width of the dark area pattern is increased, the minimum thickness of the auxiliary film 900 should be larger. The thicker the auxiliary film 900 is, the greater the effect of preventing a dark area from being visible through the superposition of lights is. However, when the thickness of the auxiliary film 900 is excessively increased, it may affect the volume and the weight of the backlight assembly. Therefore, the auxiliary film 900 may be formed to have a proper thickness in consideration of the above factors.

Referring back to FIG. 1, the backlight assembly according to the present exemplary embodiment of the present invention may further include, for example, a reflector 810 formed below the light guide plate 700 and a diffuser 830 formed on the reverse prism sheet 820.

The reflector 810 reflects light emitted from the lower surface of the light guide plate 700 and allows the light to be incident back on the inside of the light guide plate 700. The reflector 810 allows the light discharged outside to be reused, thereby increasing light collecting efficiency. The reflector 810 may be made of, for example, a polyethylene terephthalate (PET) material or a polycarbonate (PC) material.

The diffuser 830 diffuses light emitted from the reverse prism sheet 820 and allows the light to exhibit more uniform distribution. The diffuser 830 may be formed of, for example, a synthetic resin capable of diffusing light such as polymethyl metacrylate (PMMA).

In the present exemplary embodiment, as illustrated in FIG. 1, the diffuser 830 is disposed on an upper surface of the reverse prism sheet 820 but exemplary embodiments of the present invention are not limited thereto. For example, alternatively in an exemplary embodiment, the diffuser 830 may be disposed in between the reverse prism 820 and the auxiliary film 900.

Hereinafter, the uniformity of light emitted from the backlight assembly according to the present exemplary embodiment of the present invention will be described with reference to FIGS. 5 to 7 as follows.

Figure 5:
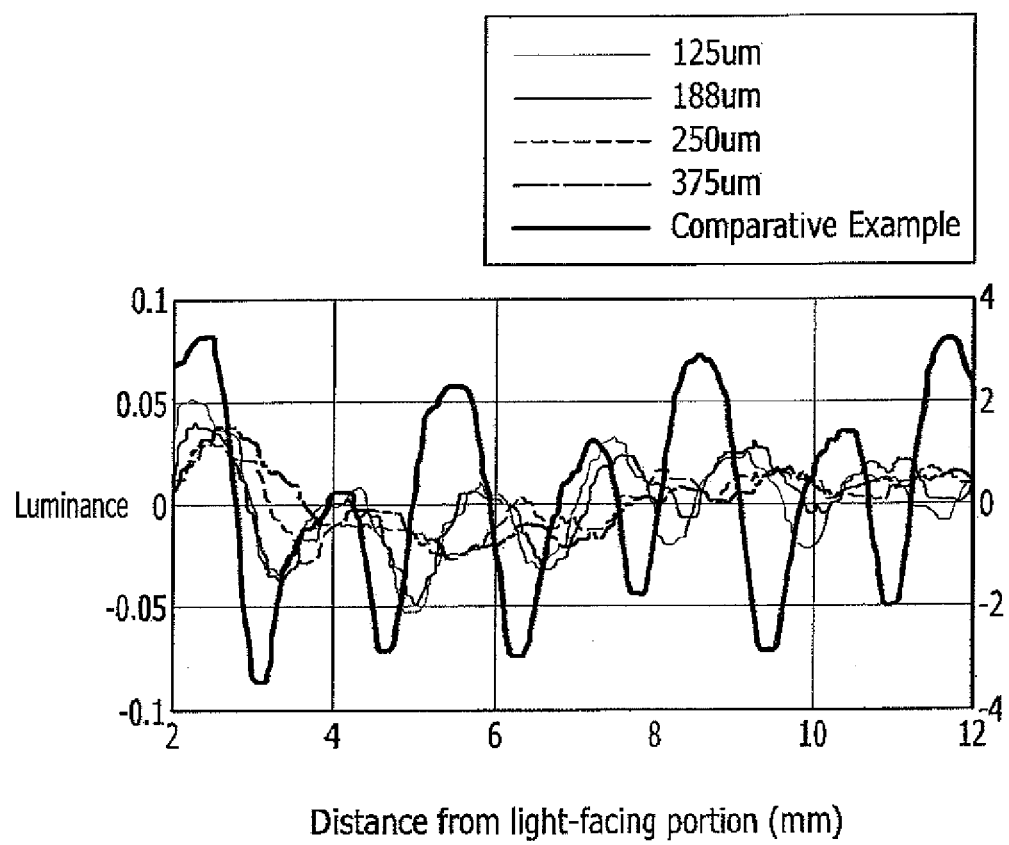
FIG. 5 is a graph showing luminance depending on a distance from a light-facing portion in the backlight assembly of FIG. 1.

FIG. 5 is a graph showing luminance depending on a distance from a light-facing portion in the backlight assembly according to the present exemplary embodiment of the present invention. FIG. 6 is a photograph showing luminance distribution of an upper surface of a backlight assembly according to a Comparative Example, and FIG. 7 is a photograph showing luminance distribution of an upper surface of the backlight assembly according to the present exemplary embodiment of the present invention.

Figure 6:
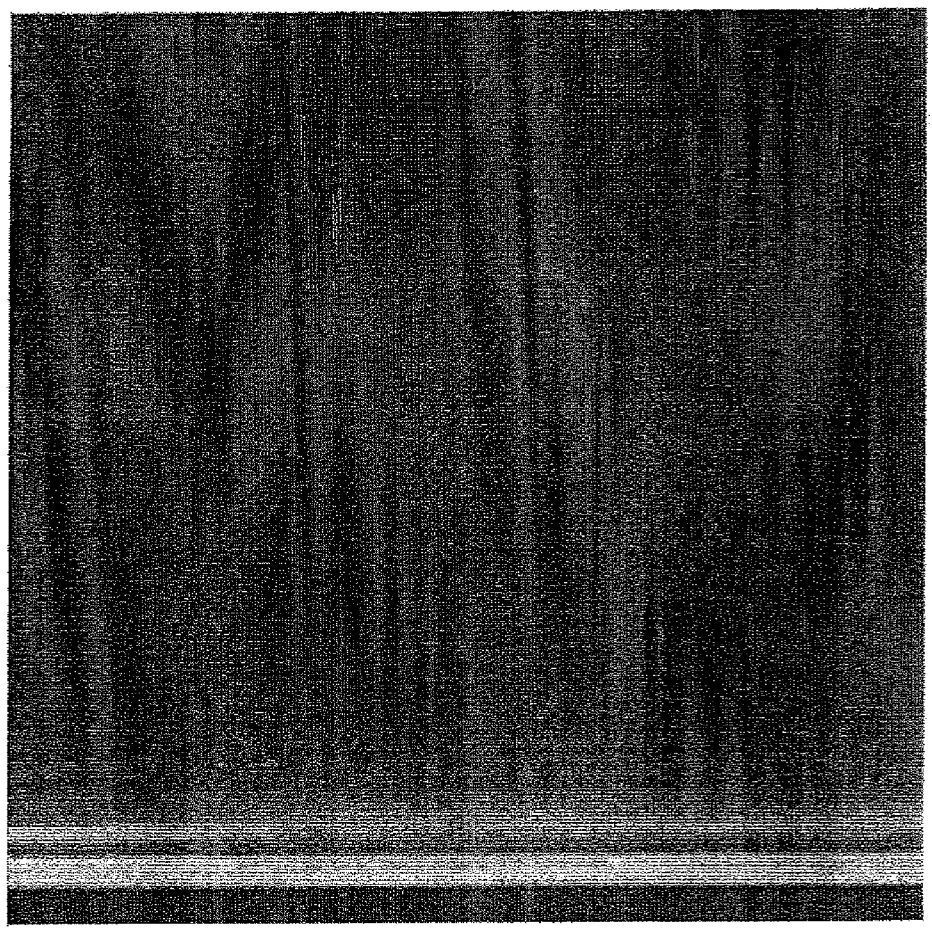
FIG. 6 is a photograph showing luminance distribution of an upper surface of a backlight assembly according to Comparative Example.

Comparative Example in FIGS. 5 and 6 corresponds to the case where the auxiliary film is removed from the backlight assembly according to the present exemplary embodiment of the present invention.

In FIG. 5, the larger a swing width of a line is, the more the luminance is changed, meaning that the luminance is not uniform, and the smaller the swing width is, the less the luminance is changed, meaning that the luminance is uniform. It can be seen that in the backlight assembly where the auxiliary film is removed, luminance is not uniform from the light-facing portion to the light-incident portion, and dark area patterns periodically appear. The dark area patterns are generated at points about 3 mm, about 4.5 mm, about 6.3 mm, about 7.8 mm, about 9.5 mm and about 11 mm from the light-facing portion, respectively.

It can be identified that in the case of including the auxiliary film, the swing width of the line is decreased compared to the case of removing the auxiliary film. In other words, the luminance becomes uniform from the light-facing portion to the light-incident portion by using the auxiliary film. Further, when the thickness of the auxiliary film is about 375 um, the swing width of the line is further reduced compared to the case where the thickness is about 125 um, such that luminance becomes further uniform.

Figure 7:
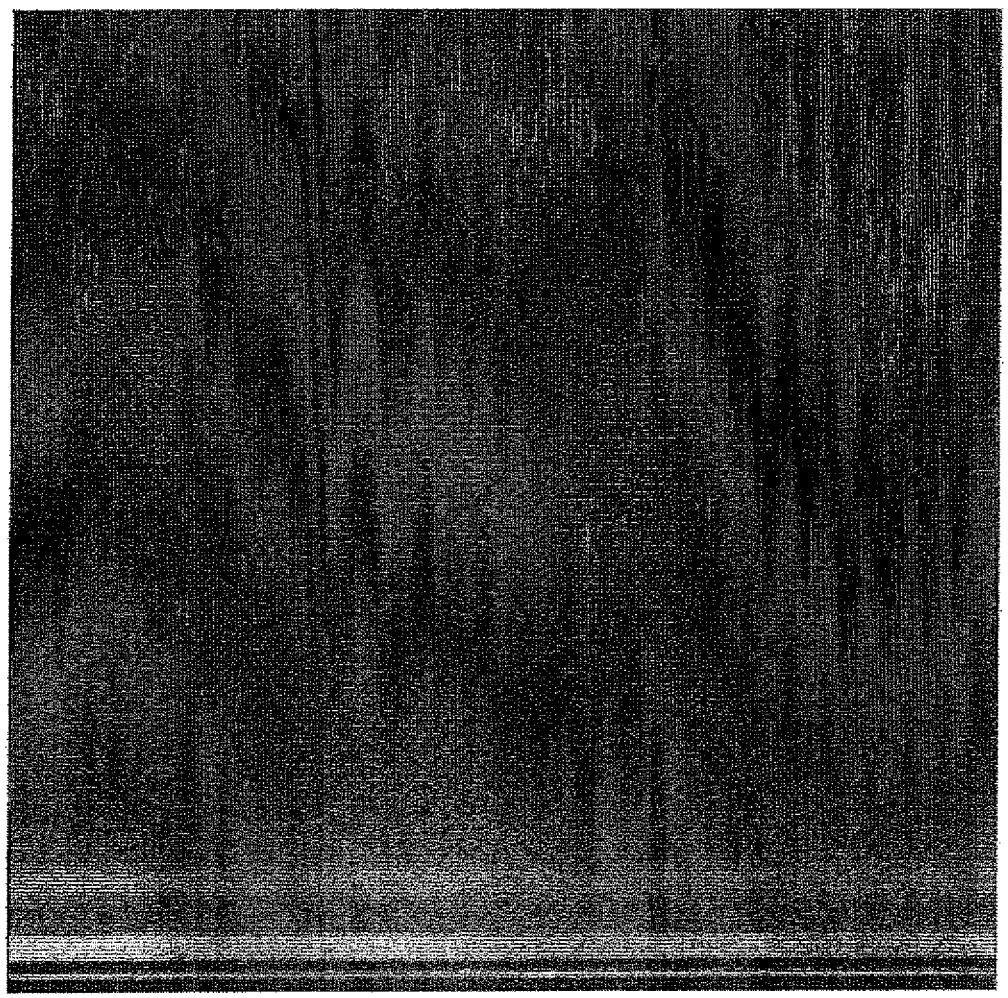
FIG. 7 is a photograph showing luminance distribution of an upper surface of the backlight assembly according of FIG. 1.

Lower sides of FIGS. 6 and 7 represent light-facing portions and upper sides thereof represent light-incident portions. As shown in FIG. 6, it can lie seen that when the auxiliary film is removed, the luminance is not uniform from the light-facing portion to the light-incident portion, and the dark area pattern appears as a horizontal stripe. As shown in FIG. 7, it can be seen that when the auxiliary film is included, the luminance is uniform from the light-facing portion to the light-incident portion, and the dark area pattern is not generated.

Next, a backlight assembly according to an exemplary embodiment of the present invention will be described with reference to FIG. 8.

Figure 8:
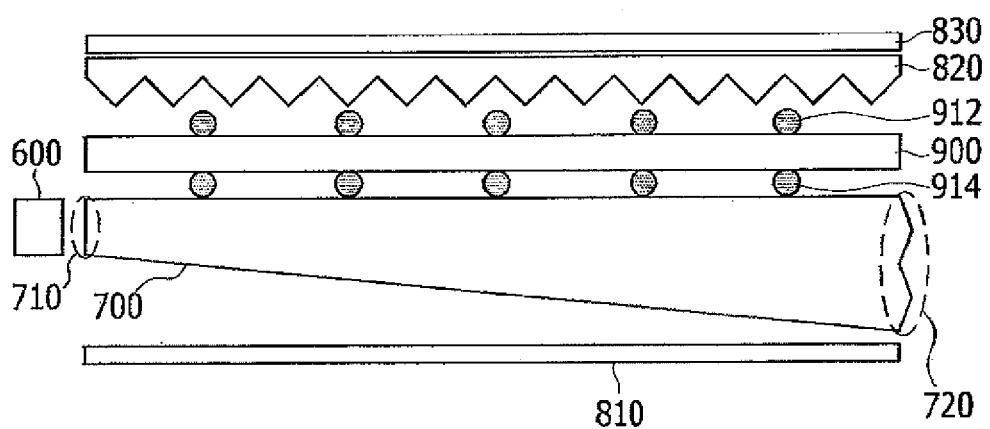
FIG. 8 is a cross-sectional view of a backlight assembly according to an exemplary embodiment of the present invention.

FIG. 8 is a cross-sectional view of a backlight assembly according to an exemplary embodiment of the present invention.

The backlight assembly according to the present exemplary embodiment of the present invention is almost the same as the backlight assembly of FIG. 1, and thus a description of the same parts as the parts of the backlight assembly of FIG. 1 is omitted and only different parts will be described below. The main difference is that protrusions are formed on an auxiliary film, which will be described in more detail below.

The backlight assembly according to the present exemplary embodiment of the present invention includes, for example, a light source unit 600 configured to supply light, a light guide plate 700 configured to guide light incident from the light source unit 600 to an upper surface thereof, a reverse prism sheet 820 formed on the light guide plate 700 and an auxiliary film 900 formed between the light guide plate 700 and the reverse prism sheet 820.

Upper protrusion patterns 912 are formed, for example, on an upper surface of the auxiliary film 900 and lower protrusion patterns 914 are formed, for example, on a lower surface of the auxiliary film 900.

The lower protrusion patterns 914 are formed, for example, on the lower surface of the auxiliary film 900, such that a predetermined gap may be formed between the light guide plate 700 and the auxiliary film 900. That is, for example, an air layer may be formed between the light guide plate 700 and the auxiliary film 900.

Further, the upper protrusion patterns 912 are formed, for example, on the upper surface of the auxiliary film 900, such that a predetermined gap is also formed between the auxiliary film 900 and the reverse prism sheet 820.

The upper protrusion patterns 912 and the lower protrusion patterns 914 may be formed by, for example, a particle coating method. The particle coating method is, for example, a method of scattering transparent spherical particles on the upper surface and the lower surface of the auxiliary film 900 to form the upper protrusion patterns 912 and the lower protrusion patterns 914.

The upper protrusion patterns 912 and the lower protrusion patterns 914 may be formed of for example, at least one material selected from a group consisting of polymethyl metacrylate (PMMA), polystyrene, polycarbonate, polyurethane, nylon, polyolefin, silica and a silicon-based material.

The upper protrusion patterns 912 and the lower protrusion patterns 914 are formed in, for example, a spherical shape. However, exemplary embodiments of the present invention are not limited to the above-mentioned shapes for the upper protrusion patterns 912 and lower protrusion patterns 914. Alternatively, for example, in an exemplary embodiment, the upper protrusion patterns 912 and the lower protrusion patterns 914 may be formed in a hemispherical shape. In other words, while the spherical particles are scattered, the spherical shape may be maintained or the shape may be changed to the hemispherical shape. In addition, when particles having shapes other than the spherical shape are used to form the patterns, the shapes of the upper protrusion patterns 912 and the lower protrusion patterns 914 may be variously changed.

The upper protrusion patterns 912 and the lower protrusion patterns 914 may be formed in, for example, a hemispherical shape, a spherical shape, a cylindrical shape, and the like and have diameters of, for example, no greater than about 5 um. When the upper protrusion patterns 912 and the lower protrusion patterns 914 are formed in a hexahedron shape, the widths thereof may be, for example, no greater than about 5 um.

The upper protrusion patterns 912 and the lower protrusion patterns 914 may be formed to have predetermined intervals, respectively or may be irregularly formed. For example, when being formed by the particle coating method, the upper protrusion patterns 912 and the lower protrusion patterns 914 in general are irregularly formed.

Next, a backlight assembly according to an exemplary embodiment of the present invention will be described with reference to FIGS. 9 to 11 as follows.

Figure 9:
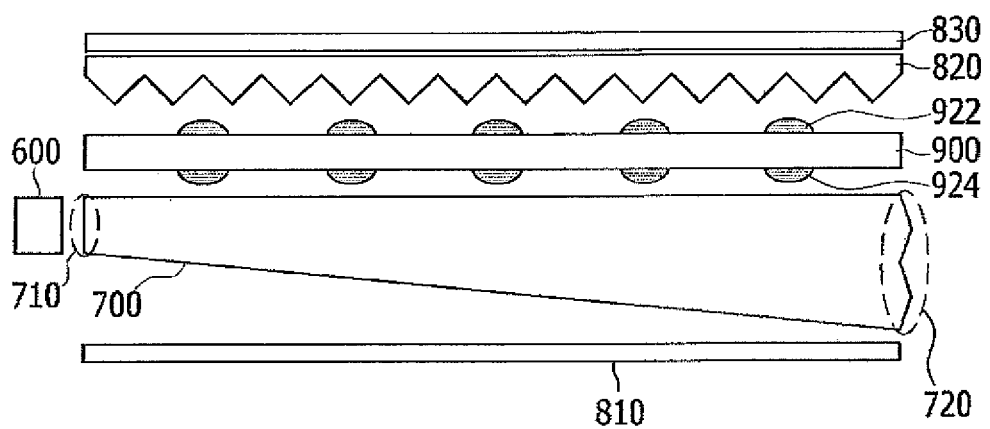
FIG. 9 is a cross-sectional view of a backlight assembly according to an exemplary embodiment of the present invention.
Figure 10:
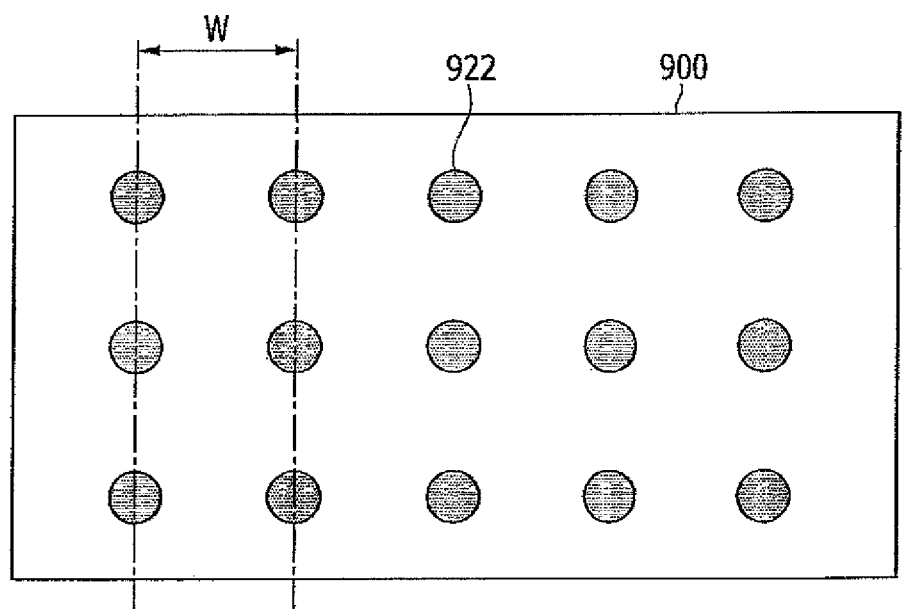
FIG. 10 is a top plan view of an auxiliary film of the backlight assembly of FIG. 9.
Figure 11:
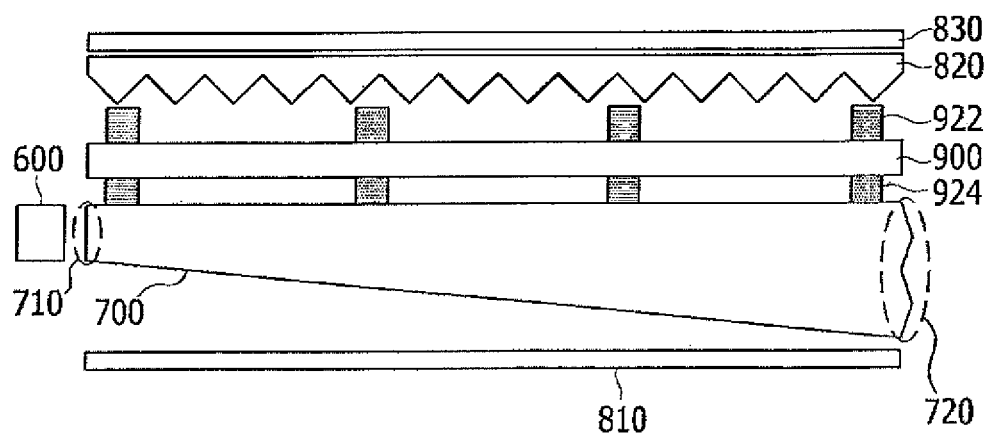
FIG. 11 is a cross-sectional view of a modified version of the backlight assembly of FIG. 9.

FIG. 9 is a cross-sectional view of a backlight assembly according to an exemplary embodiment of the present invention, and FIG. 10 is a top plan view of an auxiliary film of the backlight assembly of FIG. 9. FIG. 11 is a cross-sectional view of a modified version of the backlight assembly of FIG. 9.

The backlight assembly of FIGS. 9-11 according to the present exemplary embodiment of the present invention is almost the same as the backlight assembly of FIG. 1, and thus a description of the same parts as the parts of the backlight assembly of FIG. 1 is omitted and only different parts will be described below. The main difference is that protrusions are formed on an auxiliary film, which will be described in more detail below The backlight assembly according to the present exemplary embodiment of the present invention includes, for example, a light source unit 600 configured to supply light, a light guide plate 700 configured to guide light incident from the light source unit 600 to an upper surface thereof, a reverse prism sheet 820 formed on the light guide plate 700 and an auxiliary film 900 formed between the light guide plate 700 and the reverse prism sheet 820.

For example, upper protrusion patterns 922 are formed on an upper surface of the auxiliary film 900 and lower protrusion patterns 924 are formed on a lower surface thereof.

The lower protrusion patterns 924 are formed, for example, on the lower surface of the auxiliary film 900 so as to maintain a predetermined distance between the light guide plate 700 and the auxiliary film 900. In other words, for example, an air layer may be formed between the light guide plate 700 and the auxiliary film 900.

In addition, the upper protrusion patterns 922 are formed, for example, on the upper surface of the auxiliary film 900 so as to also maintain a predetermined distance between the auxiliary film 900 and the reverse prism sheet 820.

The upper protrusion patterns 922 and the lower protrusion patterns 924 may be formed by, for example, an imprinting method. For example, first, a UV curable resin is applied to the upper surface of the auxiliary film 900 and a mold is disposed on the UV curable resin and pressurized, followed by ultraviolet irradiation for curing to form the upper protrusion patterns 922. Subsequently, for example, a UV curable resin is applied to the lower surface of the auxiliary film 900 and a mold is disposed on the ultraviolet curable resin and pressurized, followed by ultraviolet irradiation for curing to form the lower protrusion patterns 924. In this case, the lower protrusion patterns 924 may be first formed on the lower surface of the auxiliary film 900, and the upper protrusion patterns 922 may be formed later on the upper surface thereof.

The upper protrusion patterns 922 and the lower protrusion patterns 924, as shown in FIGS. 9 and 10, may be formed in, for example, a hemispherical shape. However, exemplary embodiments of the present invention are not limited thereto, but rather, for example, and as shown in FIG. 11, cross-sectional shapes of the upper protrusion patterns 922 and the lower protrusion patterns 924 may be a quadrangle. That is, the upper protrusion patterns 922 and the lower protrusion patterns 924 may be formed, for example, in a hexahedron shape, a cylindrical shape, and the like. The shapes of the upper protrusion patterns 922 and the lower protrusion patterns 924 may be modified depending on a shape of the mold without limit.

When the upper protrusion patterns 922 and the lower protrusion patterns 924 are formed in a hemispherical or cylindrical shape, diameters thereof may be, for example, no greater than about 10 um. When the upper protrusion patterns 922 and the lower protrusion patterns 924 are formed in a hexahedron shape, widths thereof may be, for example, no greater than about 10 um.

The upper protrusion patterns 922 and the lower protrusion patterns 924 may be formed to have predetermined intervals, respectively or may be irregularly formed. In this case, the intervals (w) of the upper protrusion patterns 922 and the lower protrusion patterns 924 may be, for example, no greater than about 10 mm.

Next, a backlight assembly according to an exemplary embodiment of the present invention will be described below with reference to FIG. 12.

Figure 12:
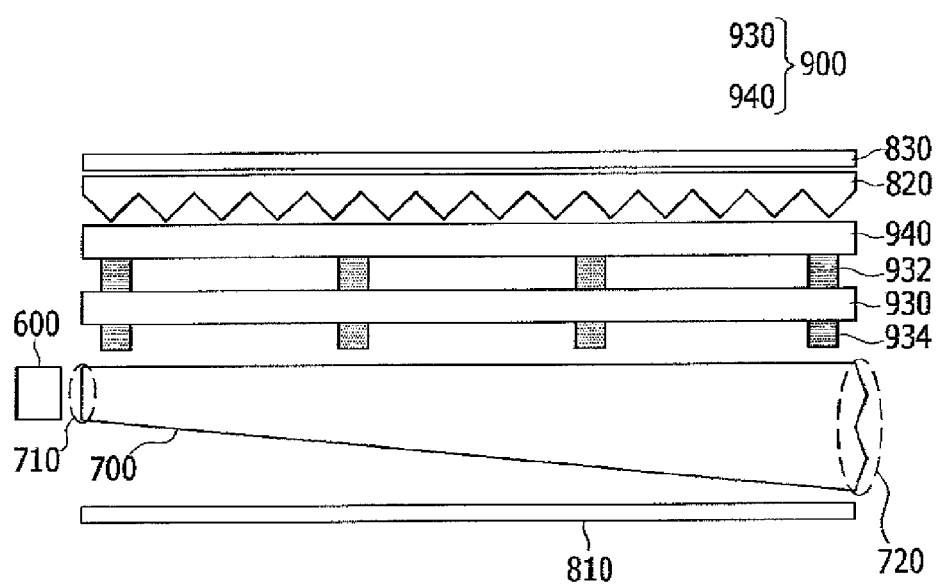
FIG. 12 is a cross-sectional view of a backlight assembly according to an exemplary embodiment of the present invention.

FIG. 12 is a cross-sectional view of a backlight assembly according to an exemplary embodiment of the present invention.

The backlight assembly according to the present exemplary embodiment of the present invention is almost the same as the backlight assembly illustrated in FIG. 1, and thus a description of the same parts as the parts of the backlight assembly of FIG. 1 is omitted and only different parts will be described below The main difference is that an auxiliary film is formed of a plurality of layers, which will be described in more detail below.

The backlight assembly according to the present exemplary embodiment of the present invention includes, for example, a light source unit 600 configured to supply light, a light guide plate 700 configured to guide light incident from the light source unit 600 to an upper surface thereof, a reverse prism sheet 820 formed on the light guide plate 700 and an auxiliary film 900 formed between the light guide plate 700 and the reverse prism sheet 820.

The auxiliary film 900 may be formed of, for example, a plurality of layers. For example, the auxiliary film 900 may have a shape in which a first film 930 and a second film 940 are laminated. That is, the first film 930 is formed on the light guide plate 700, the second film 940 is formed on the first film 930, and the reverse prism sheet 820 is formed on the second film 940. The first film 930 and the second film 940 may, for example, be attached to each other.

An air layer may be formed, for example, between the first film 930 and the light guide plate 700. In addition, an air layer may also be formed, for example, between the first film 930 and the second film 940. Alternatively, for example, a space between the first film 930 and the second film 940 may be filled with another medium rather than air. The medium filled between the first film 930 and the second film 940 may be formed of, for example, a material having a different refractive index from that of the auxiliary film 900.

Upper protrusion patterns 932 are formed, for example, on an upper surface of the first film 930 and lower protrusion patterns 934 are formed, for example, on a lower surface thereof.

The lower protrusion patterns 934 are formed, for example, on the lower surface of the first film 930 so as to maintain a predetermined distance between the light guide plate 700 and the auxiliary film 900. That is, an air layer may, for example, be formed between the light guide plate 700 and the auxiliary film 900.

The upper protrusion patterns 932 are formed, for example, between the first film 930 and the second film 940 so as to maintain a predetermined distance between the first film 930 and the second film 940.

The upper protrusion patterns 932 and the lower protrusion patterns 934 may be formed by, for example, a particle coating method or an imprinting method. When being formed by the particle coating method, the upper protrusion patterns 932 and the lower protrusion patterns 934 may be made of, for example, polymethyl metacrylate (PMMA), polystyrene, polycarbonate, polyurethane, nylon, polyolefin, silica and a silicon-based material. Alternatively, in an exemplary embodiment, the upper protrusion patterns 932 and the lower protrusion patterns 934 may be formed by, for example, an imprinting method. For example, when being formed by the imprinting method, the upper protrusion patterns 932 and the lower protrusion patterns 934 may be made of a UV curable resin.

The upper protrusion patterns 932 and the lower protrusion patterns 934 may be formed in various shapes. For example, the upper protrusion patterns 932 and the lower protrusion patterns 934 may be formed in a spherical shape, a hemispherical shape, a cylindrical shape, or a hexahedron shape.

Even though the auxiliary film 900 is formed of two layers above, exemplary embodiments of the present invention are limited thereto. For example, the auxiliary film 900 may be formed of three or more layers.

Next, a backlight assembly according to an exemplary embodiment of the present invention will be described below with reference to FIG. 13.

Figure 13:
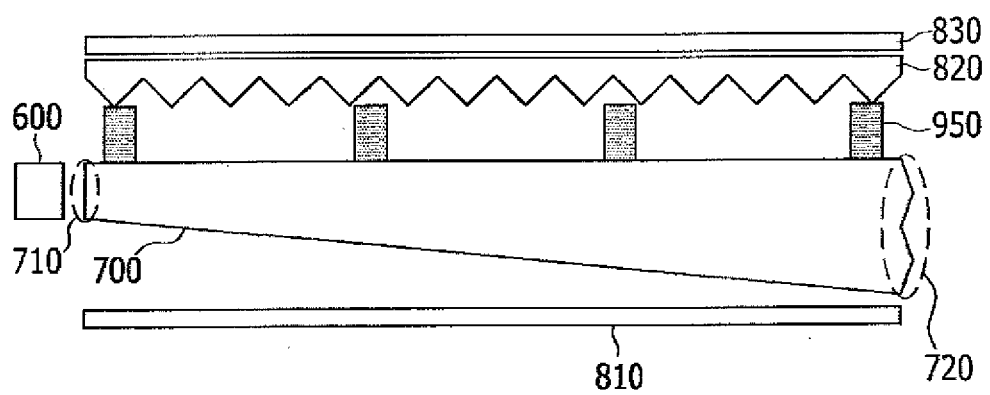
FIG. 13 is a cross-sectional view of a backlight assembly according to an exemplary embodiment of the present invention.

FIG. 13 is a cross-sectional view of a backlight assembly according to an exemplary embodiment of the present invention.

The backlight assembly according to the present exemplary embodiment of the present invention is almost the same as the backlight assembly illustrated in FIG. 1, and thus a description of the same parts as the parts of the backlight assembly of FIG. 1 is omitted and only different parts will be described below The main difference is the shape of an auxiliary film, which will be described in more detail below.

The backlight assembly according to the present exemplary embodiment of the present invention includes, for example, a light source unit 600 configured to supply light, a light guide plate 700 configured to guide light incident from the light source unit 600 to an upper surface thereof, a reverse prism sheet 820 formed on the light guide plate 700 and an auxiliary film 950 formed between the light guide plate 700 and the reverse prism sheet 820.

In the aforementioned backlight assemblies described in connection with FIGS. 1, 8, 9, 10, 11 and 12, the auxiliary film 950 has the panel shape and has a similar shape and area in a plane to those of the light guide plate 700 and the reverse prism sheet 820. In the present exemplary embodiment of FIG. 13, the auxiliary film 950 has a different shape in a plane from that of the light guide plate 700 and the reverse prism sheet 820.

The auxiliary film 950 may be formed of, for example, a plurality of protrusion patterns. The auxiliary film 950 may be formed, for example, on a lower surface of the reverse prism sheet 820. In this case, the auxiliary film 950 may be formed of, for example, the same material as that of the reverse prism sheet 820 so as to protrude from the lower surface of the reverse prism sheet 820. Alternatively, the auxiliary film 950 may be formed of, for example, a different material from that of the reverse prism sheet 820 by a separate process. In this case, the auxiliary film 950 may be formed by, for example, a particle coating method or an imprinting method.

Having described exemplary embodiments of the present invention, it is further noted that it is readily apparent to those of ordinary skill in the art that various modifications may be made without departing from the spirit and scope of the invention which is defined by the metes and bounds of the appended claims

What is claimed is:

1. A backlight assembly, comprising:
a light source unit configured to supply light;
a light guide plate configured to guide light incident from the light source unit to an upper surface thereof;
a reverse prism sheet disposed on the light guide plate and having a prism-shaped lower surface;
an auxiliary film disposed between the light guide plate and the reverse prism sheet;
a first air layer disposed between the reverse prism sheet and the auxiliary film; and
a plurality of upper protrusion patterns disposed on an upper surface of the auxiliary film between the auxiliary film and the reverse prism sheet, the plurality of upper protrusion patterns maintaining the first air layer,
wherein the light guide plate includes a light-incident portion on which light is incident from the light source unit and a light-facing portion facing the light-incident portion and having a prism shape, and
wherein a thickness of the light-facing portion is larger than a thickness of the light-incident portion.

2. The backlight assembly of claim 1, further comprising: a second air layer disposed between the light guide plate and the auxiliary film.

3. The backlight assembly of claim 1, further comprising:
a plurality of lower protrusion patterns disposed on a lower surface of the auxiliary film between the auxiliary film and the light guide plate.

4. The backlight assembly of claim 3, wherein the upper protrusion patterns and the lower protrusion patterns are disposed in at least one of a spherical shape, a hemispherical shape, a cylindrical shape and hexahedron shape.

5. The backlight assembly of claim 3, wherein the upper protrusion patterns and the lower protrusion patterns are formed of at least one material selected from a group consisting of polymethyl metacrylate, polystyrene, polycarbonate, polyurethane, nylon, polyolefin, silica and a silicon-based material.

6. The backlight assembly of claim 5, wherein diameters or widths of the upper protrusion patterns and the lower protrusion patterns are no greater than about 5 um.

7. The backlight assembly of claim 3, wherein the upper protrusion patterns and the lower protrusion patterns are made of an ultraviolet ray curable resin.

8. The backlight assembly of claim 7, wherein diameters or widths of the upper protrusion patterns and the lower protrusion patterns are no greater than about 10 um.

9. The backlight assembly of claim 8, wherein intervals of the upper protrusion patterns and the lower protrusion patterns are no greater than about 10 mm.

10. The backlight assembly of claim 1, wherein the auxiliary film includes a plurality of layers and an intermediate protrusion pattern disposed between the plurality of layers.

11. The backlight assembly of claim 10, wherein a space between the plurality of layers is filled with a medium having a different refractive index from a refractive index of the auxiliary film.

12. The backlight assembly of claim 1, wherein the auxiliary film includes a plurality of protrusion patterns disposed on a lower surface of the reverse prism sheet.

13. The backlight assembly of claim 1, wherein the auxiliary film includes a transparent material.

14. The backlight assembly of claim 13, wherein the auxiliary film includes a material having a refractive index of from about 1.41 to about 1.8.

15. The backlight assembly of claim 14, wherein a minimum thickness of the auxiliary film is represented by $$h_{min} = \frac{d}{\tan\theta_2 - \tan\theta_1}$$

($h_{min}$ denotes a minimum thickness of the auxiliary film, d denotes a width of a dark area pattern where light is not emitted to the upper surface of the light guide plate, $\theta_1$ denotes an emission angle of light which is reflected by the lower surface of the light guide plate once and emitted from the light guide plate, and $\theta_2$ denotes an emission angle of light which is reflected by the lower surface of the light guide plate twice and emitted from the light guide plate).

16. The backlight assembly of claim 1, wherein the thickness of the light guide plate gradually increases toward the light-facing portion from the light-incident portion.

17. The backlight assembly of claim 16, further comprising: a reflector disposed below the light guide plate; and a diffuser disposed on the reverse prism sheet.

18. The backlight assembly of claim 1, wherein the auxiliary film includes a first film disposed on the light guide plate and a second film disposed on the first film and wherein the first and second film are attached to each other.

19. The backlight assembly of claim 1, wherein the auxiliary film includes a first film disposed on the light guide plate and a second film disposed on the first film and wherein the auxiliary film has a shape in which the first film and the second film are laminated.

20. The backlight assembly of claim 1, wherein the auxiliary film protrudes from a lower surface of the reverse prism sheet and wherein the auxiliary film and the reverse prism sheet are formed of a same material as each other.

21. The backlight assembly of claim 1, wherein the auxiliary film and the light guide plate are formed of a same material as each other.

22. A backlight assembly, comprising:
a light source unit configured to supply light;
a light guide plate configured to guide light incident from the light source unit to an upper surface thereof, wherein the light guide plate includes a light-incident portion on which light is incident from the light source unit and a light-facing portion facing the light-incident portion and having a prism shape;
a reverse prism sheet disposed on the light guide plate;
an auxiliary film disposed between the light guide plate and the reverse prism sheet, wherein the auxiliary film includes a first film disposed on an upper surface of the light guide plate and a second film disposed on an upper surface of the first film and on a lower surface of the reverse prism sheet;
a first air layer disposed between the reverse prism sheet and the auxiliary film;
a plurality of upper protrusion patterns disposed between the first film and the second film of the auxiliary film so as to maintain a predetermined distance between the first film and the second film; and a plurality of lower protrusion patterns disposed on a lower surface of the first film of the auxiliary film so as to maintain a predetermined distance between the light guide plate and the auxiliary film, wherein a thickness of the light-facing portion is larger than a thickness of the light-incident portion.

23. The backlight assembly of claim 22, wherein a thickness of the light-facing portion is larger than a thickness of the light-incident portion and wherein the light-facing portion has a prism shape.

24. The backlight assembly of claim 22, further comprising a second air layer disposed between the first film and the second film of the auxiliary film.

* * * * *